(12) United States Patent
Overkamp et al.

(10) Patent No.: US 7,069,420 B1
(45) Date of Patent: Jun. 27, 2006

(54) DECODE AND DISPATCH OF MULTI-ISSUE AND MULTIPLE WIDTH INSTRUCTIONS

(75) Inventors: Gregory A. Overkamp, Austin, TX (US); Charles P. Roth, Austin, TX (US); Ravi P. Singh, Austin, TX (US)

(73) Assignees: Intel Corporation, Santa Clara, CA (US); Analog Devices, Inc., Norwood, MA (US)

( * ) Notice: Subject to any disclaimer, the term of this patent is extended or adjusted under 35 U.S.C. 154(b) by 665 days.

(21) Appl. No.: 09/675,815

(22) Filed: Sep. 28, 2000

(51) Int. Cl.
*G06F 9/30* (2006.01)

(52) U.S. Cl. .................................. 712/208; 712/210

(58) Field of Classification Search ................ 712/208, 712/210, 211, 213, 214, 215, 209, 23
See application file for complete search history.

(56) References Cited

U.S. PATENT DOCUMENTS

| | | | | |
|---|---|---|---|---|
| 4,200,927 A | * | 4/1980 | Hughes et al. ............... 712/235 |
| 5,758,112 A | * | 5/1998 | Yeager et al. ................ 712/217 |
| 5,809,273 A | * | 9/1998 | Favor et al. ................. 712/210 |
| 5,826,053 A | * | 10/1998 | Witt ............................ 712/210 |
| 5,926,642 A | * | 7/1999 | Favor ............................. 712/1 |
| 5,987,235 A | * | 11/1999 | Tran ............................ 712/210 |
| 5,991,869 A | * | 11/1999 | Tran et al. ................... 712/204 |
| 6,134,649 A | * | 10/2000 | Witt ............................ 712/204 |
| 6,292,845 B1 | * | 9/2001 | Fleck et al. ..................... 710/5 |

* cited by examiner

Primary Examiner—Henry W. H. Tsai
(74) Attorney, Agent, or Firm—Fish & Richardson P.C.

(57) ABSTRACT

In one particular embodiment, a processor receives and processes a plurality of instruction from a single instruction register. The processor loads the plurality of instructions into a single register and determines the number and size of instructions while the instructions are in the register. Each of the plurality of instructions is then simultaneously presented to the decoder. The decoder then decodes a first of the plurality of instructions and determines whether any additional instructions are present.

18 Claims, 6 Drawing Sheets

DECODE AND DISPATCH OF MULTI-ISSUE AND MULTIPLE WIDTH INSTRUCTIONS

TECHNICAL FIELD

This invention relates to digital signal processors, and more particularly to pre-decoding multiple instructions from a single instruction register within a digital signal processor.

BACKGROUND

Digital signal processing is concerned with the representation of signals in digital form and the transformation or processing of such signal representation using numerical computation. Digital signal processing is a core technology for many of today's high technology products in fields such as wireless communications, networking, and multimedia. One reason for the prevalence of digital signal processing technology has been the development of low cost, powerful digital signal processors (DSPs) that provide engineers the reliable computing capability to implement these products cheaply and efficiently. Since the development of the first DSPs, DSP architecture and design have evolved to the point where even sophisticated real-time processing of video-rate sequences can be performed.

DSPs are often used for a variety of multimedia applications such as digital video, imaging, and audio. DSPs can manipulate the digital signals to create and open such multimedia files.

MPEG-1 (Motion Picture Expert Group), MPEG-2, MPEG-4 and H.263 are digital video compression standards and file formats. These standards achieve a high compression rate of the digital video signals by storing mostly changes from one video frame to another, instead of storing each entire frame. The video information may then be further compressed using a number of different techniques.

The DSP may be used to perform various operations on the video information during compression. These operations may include motion search and spatial interpolation algorithms. The primary intention is to measure distortion between blocks within adjacent frames. These operations are computationally intensive and may require high data throughput.

The MPEG family of standards is evolving to keep pace with the increasing bandwidth requirements of multimedia applications and files. Each new version of the standard presents more sophisticated algorithms that place even greater processing requirements on the DSPs used in MPEG compliant video processing equipment.

Video processing equipment manufacturers often rely on application-specific integrated circuits (ASICs) customized for video encoding under the MPEG and H.263 standards. However, ASICs are complex to design, costly to produce and less flexible in their application than general-purpose DSPs.

DESCRIPTION OF DRAWINGS

These and other features and advantages of the invention will become more apparent upon reading the following detailed description and upon reference to the accompanying drawings.

DETAILED DESCRIPTION

Figure 1:
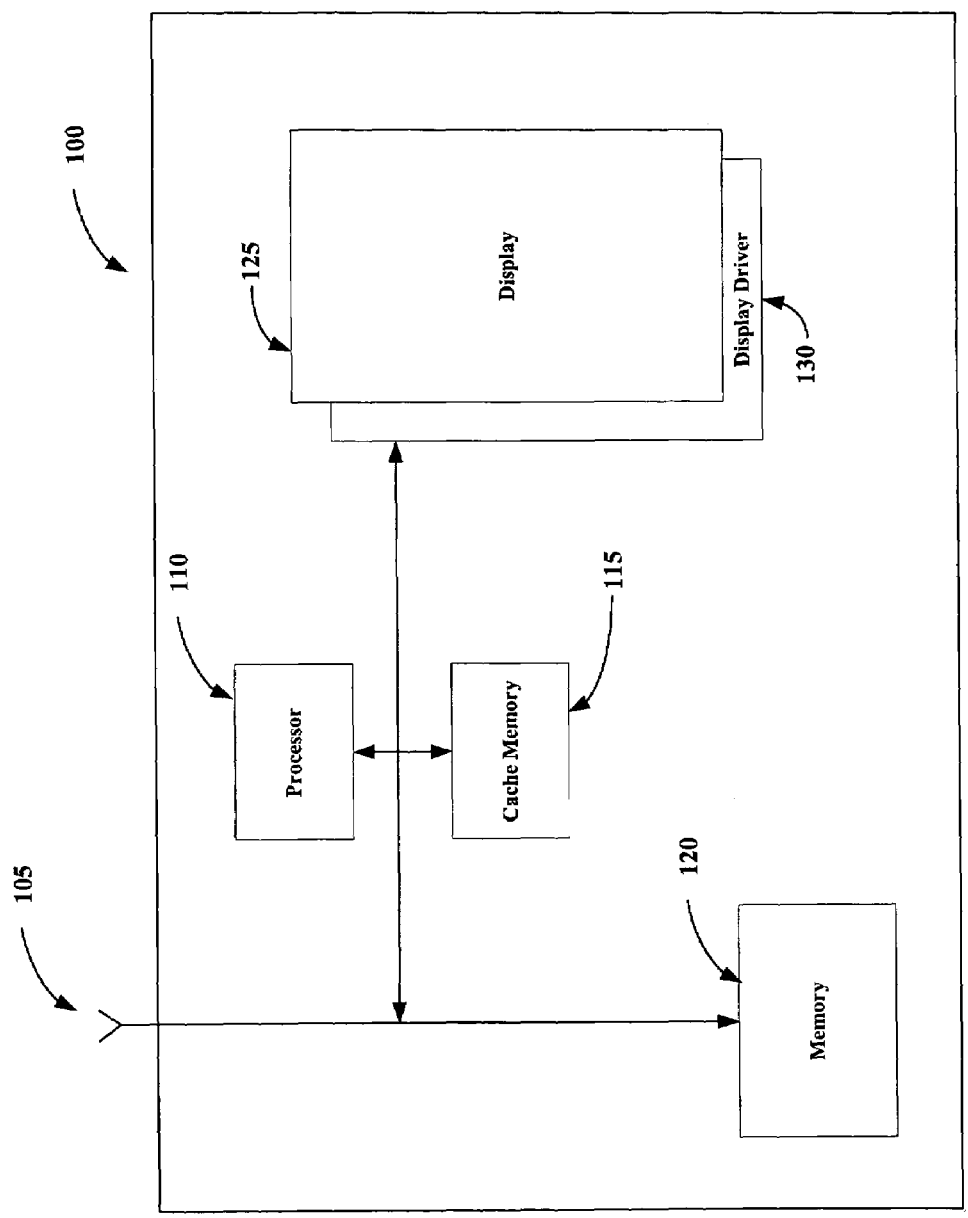
FIG. 1 is a block diagram of a mobile video device utilizing a processor according to one embodiment of the present invention.

FIG. 1 illustrates a mobile video device 100 including a processor according to an embodiment of the invention. The mobile video device 100 may be a hand-held device which displays video images produced from an encoded video signal received from an antenna 105 or a digital video storage medium 120, e.g., a digital video disc (DVD) or a memory card. A processor 110 communicates with a cache memory 115 which may store instructions and data for the processor operations. The processor 110 may be a microprocessor, a digital signal processor (DSP), a microprocessor controlling a slave DSP, or a processor with an hybrid microprocessor/DSP architecture. For the purposes of this application, the processor 110 will be referred to hereinafter as a DSP 110.

The DSP 110 may perform various operations on the encoded video signal, including, for example, analog-to-digital conversion, demodulation, filtering, data recovery, and decoding. The DSP 110 may decode the compressed digital video signal according to one of various digital video compression standards such as the MPEG-family of standards and the H.263 standard. The decoded video signal may then be input to a display driver 130 to produce the video image on a display 125.

Hand-held devices generally have limited power supplies. Also, video decoding operations are computationally intensive. Accordingly, a processor for use in such a device is advantageously a relatively high speed, low power device.

The DSP 110 may have a deeply pipelined, load/store architecture. By employing pipelining, the performance of the DSP may be enhanced relative to a non-pipelined DSP. Instead of fetching a first instruction, executing the first instruction, and then fetching a second instruction, a pipelined DSP 110 fetches the second instruction concurrently with execution of the first instruction, thereby improving instruction throughput. Further, the clock cycle of a pipelined DSP may be shorter than that of a non-pipelined DSP, in which the instruction must be fetched and executed in the same clock cycle.

Such a DSP 110 is contemplated for use in video camcorders, teleconferencing, PC video cards, and High-Definition Television (HDTV). In addition, the DSP 110 is also contemplated for use in connection with other technologies utilizing digital signal processing such as voice processing used in mobile telephony, speech recognition, and other applications.

Figure 2:
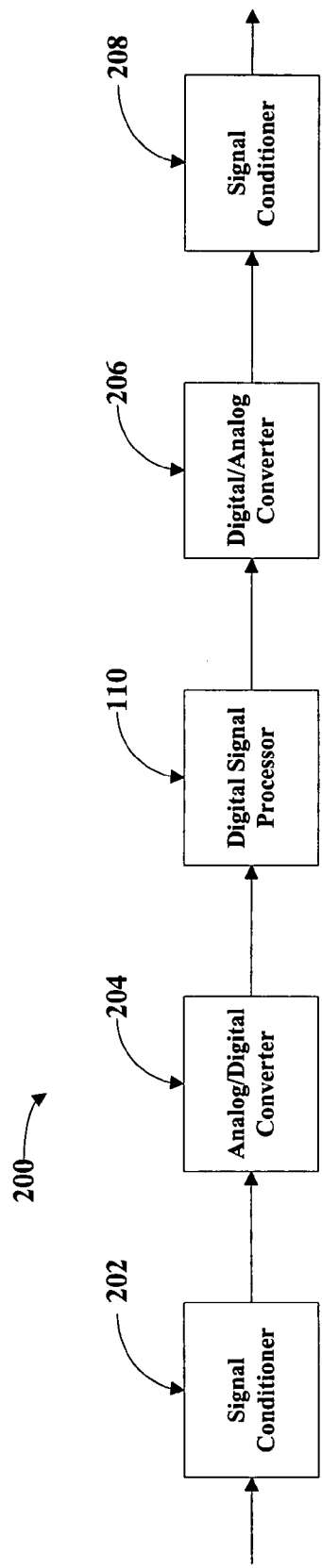
FIG. 2 is a block diagram of a signal processing system according to an embodiment of the present invention.

Turning now to FIG. 2, a block diagram of a signal processing system 200 including DSP 110 according to an embodiment is shown. One or more analog signals are provided by an external source, e.g., antenna 105, to a signal conditioner 202. Signal conditioner 202 is configured to perform certain preprocessing functions upon the analog signals. Exemplary preprocessing functions may include mixing several of the analog signals together, filtering, amplifying, etc. An analog-to-digital converter (ADC) 204 is coupled to receive the preprocessed analog signals from signal conditioner 202 and to convert the preprocessed analog signals to digital signals consisting of samples, as described above. The samples are taken according to a sampling rate determined by the nature of the analog signals received by signal conditioner 202. The DSP 110 is coupled to receive digital signals at the output of the ADC 204. The DSP 110 performs the desired signal transformation upon the received digital signals, producing one or more output digital signals. A digital-to-analog converter (DAC) 206 is coupled to receive the output digital signals from the DSP 110. The DAC 206 converts the output digital signals into output analog signals. The output analog signals are then conveyed to another signal conditioner 208. The signal conditioner 208 performs post-processing functions upon the output analog signals. Exemplary post-processing functions are similar to the preprocessing functions listed above. It is noted that various configurations of the signal conditioners 202 and 208, the ADC 204, and the DAC 206 are well known. Any suitable configuration of these devices may be coupled into a signal processing system 200 with the DSP 110.

Figure 3:
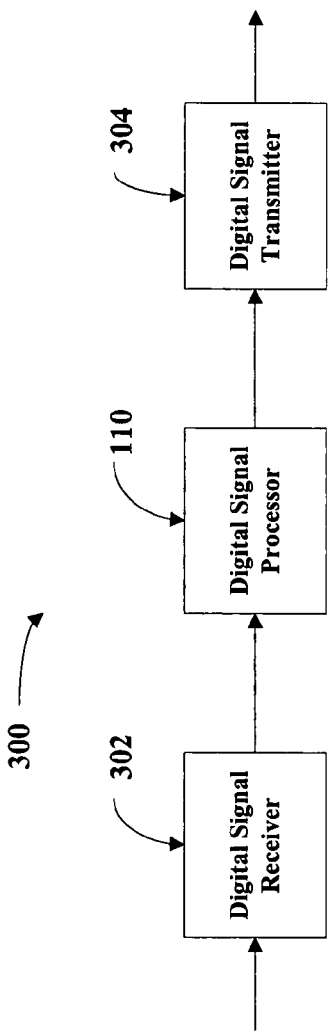
FIG. 3 is a block diagram of an alternative signal processing system according to an embodiment of the present invention.

Turning next to FIG. 3, a signal processing system 300 according to another embodiment is shown. In this embodiment, a digital receiver 302 is configured to receive one or more digital signals and to convey the received digital signals to the DSP 110. As with the embodiment shown in FIG. 2, DSP 110 performs the desired signal transformation upon the received digital signals to produce one or more output digital signals. Coupled to receive the output digital signals is a digital signal transmitter 304. In one exemplary application, the signal processing system 300 is a digital audio device in which the digital receiver 302 conveys to the DSP 110 digital signals indicative of data stored on the digital storage device 120. The DSP 110 then processes the digital signals and conveys the resulting output digital signals to the digital transmitter 304. The digital transmitter 304 then causes values of the output digital signals to be transmitted to the display driver 130 to produce a video image on the display 125.

Figure 4:
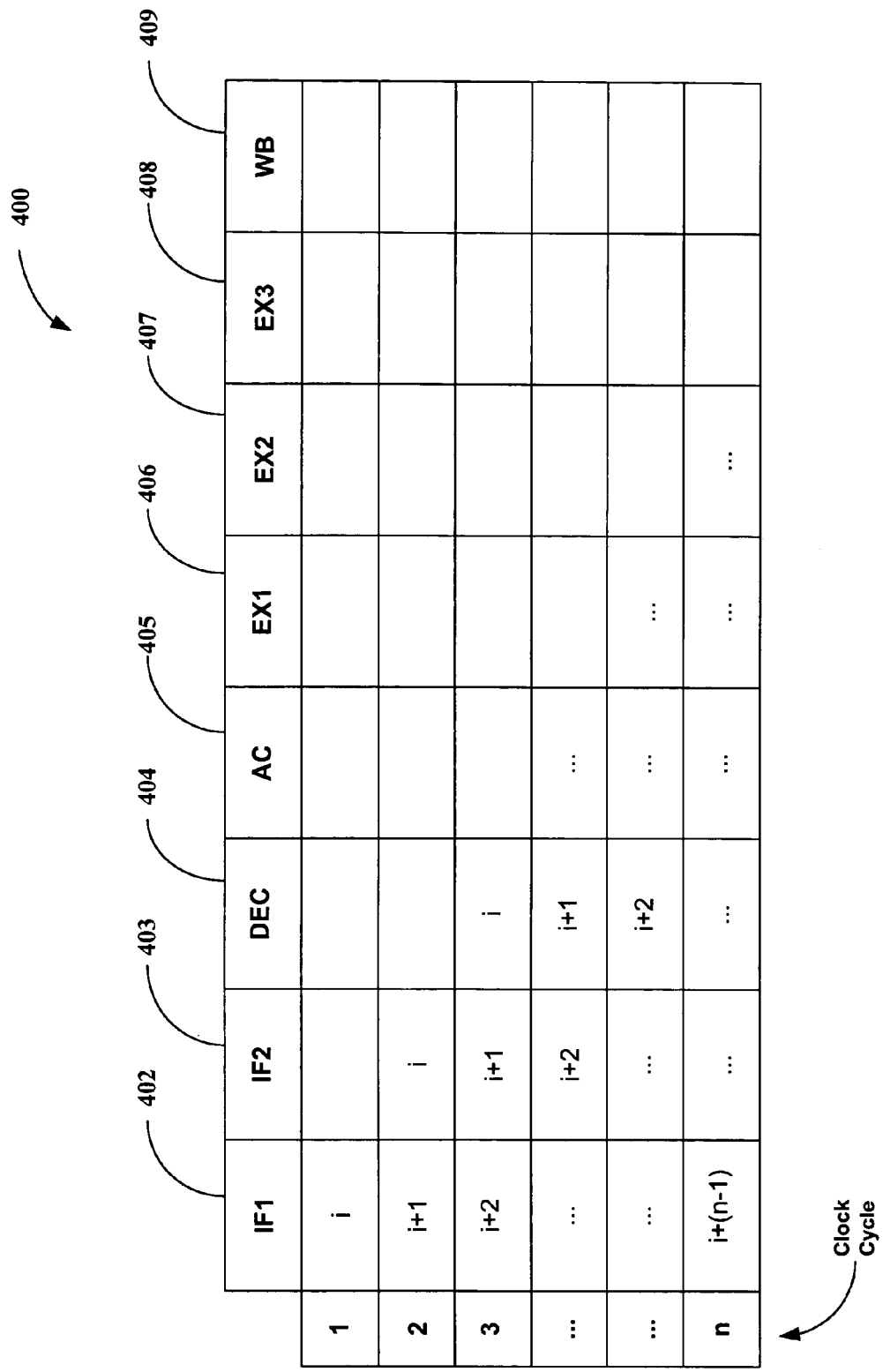
FIG. 4 illustrates exemplary pipeline stages of the processor in FIG. 1 according to an embodiment of the present invention.

The pipeline illustrated in FIG. 4 includes eight stages, which may include instruction fetch 402–403, decode 404, address calculation 405, execution 406–408, and write-back 409 stages. An instruction i may be fetched in one clock cycle and then operated on and executed in the pipeline in subsequent clock cycles concurrently with the fetching of new instructions, e.g., i+1 and i+2.

Pipelining may introduce additional coordination problems and hazards to processor performance. Jumps in the program flow may create empty slots, or "bubbles," in the pipeline. Situations which cause a conditional branch to be taken or an exception or interrupt to be generated may alter the sequential flow of instructions. After such an occurrence, an new instruction must be fetched outside of the sequential program flow, making the remaining instructions in the pipeline irrelevant. Methods such as data forwarding, branch prediction, and associating valid bits with instruction addresses in the pipeline may be employed to deal with these complexities.

Figure 5:
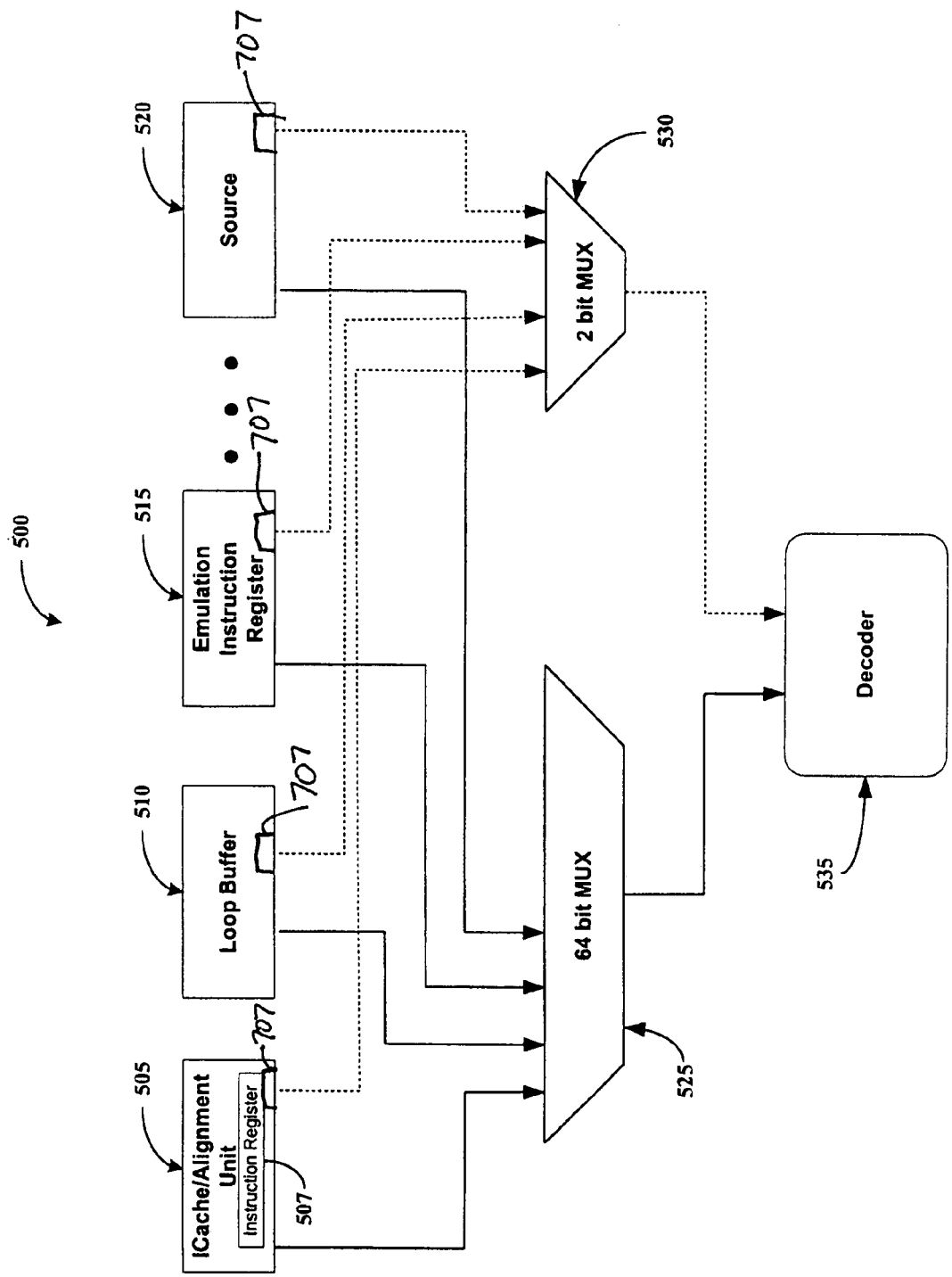
FIG. 5 is a block diagram of a multiple source decoder feed system according to one embodiment of the present invention.

FIG. 5 is a block diagram of a multiple source decoder feed system 500 according to one embodiment of the present invention. The decoder feed system 500 may include a plurality of sources such as an Icache/alignment Unit 505, a loop buffer 510, an emulation instruction register 515, and other sources 520, a 64-bit multiplexer (MUX) 525, a 2-bit multiplexer (MUX) 530, and a decoder 535. The decoder feed system 500 may allow the decoder 535 to be fed directly by one of the plurality of sources without having to transfer data to the instruction register 507. Because the data does not have to be transferred to the instruction register 507 in this particular embodiment, the instruction latency may be reduced and the performance of the DSP 110 is increased. Further, each of the plurality of sources may provide instructions having the same format, including width bits. The design of the decoder 535 may be simplified by ensuring each of the plurality of sources provides similarly formatted instructions, thereby improving on cycle time.

Each of the Icache/alignment unit 505, the loop buffer 510, the emulation instruction register 515, or any other source 520 may be connected to both the 64-bit MUX 525 and the 2-bit MUX 530. Each of these sources may provide instructions of multiple widths, such as 16-bit, 32-bit, or 64-bit instructions. These instructions are provided to the 64-bit MUX 525. Of course, other size MUXs capable of handling other size instructions may be used without departing from the spirit of the invention. Each of the sources also provides a signal to the 2-bit MUX 530 indicative of the width of the instruction provided to the 64-bit MUX 525. With a 2-bit signal, there are 4 possible values for the 2-bit width signal. For example, width bits of 00 indicates the instruction is invalid, width bits of 01 indicates a 16-bit instruction, width bits of 10 indicates a 32-bit instruction, and width bits of 11 indicates a 64-bit instruction. Once a particular instruction source is selected, both the instruction from the 64-bit MUX 525 and the width bits from the 2-bit MUX 530 from that source may be transferred to the decoder 535 for processing.

The multiplexers 525, 530 of the present invention provide the proper information to the decoder 535 based on the selected instruction source 505–520. However, if multiple sources 505–520 are selected, the multiplexers 525, 530 may include priority logic to control the distribution of information to the decoder 535. For example, the multiplexers 525, 530 may include priority logic stating that information from the emulation instruction register 515 has the highest priority, while information from the Icache/Alignment unit 505 is to be processed prior to information from the loop buffer 510. The priority schedule may be pre-determined or updated throughout processing.

Although two multiplexers 525 and 530 are shown, it can be appreciated that any number of multiplexers may be used to permit selection of additional information. For example, an additional multiplexer may receive pre-decode information from each of the sources 505–520 and send the appropriate pre-decode information to the decoder.

Figure 6:
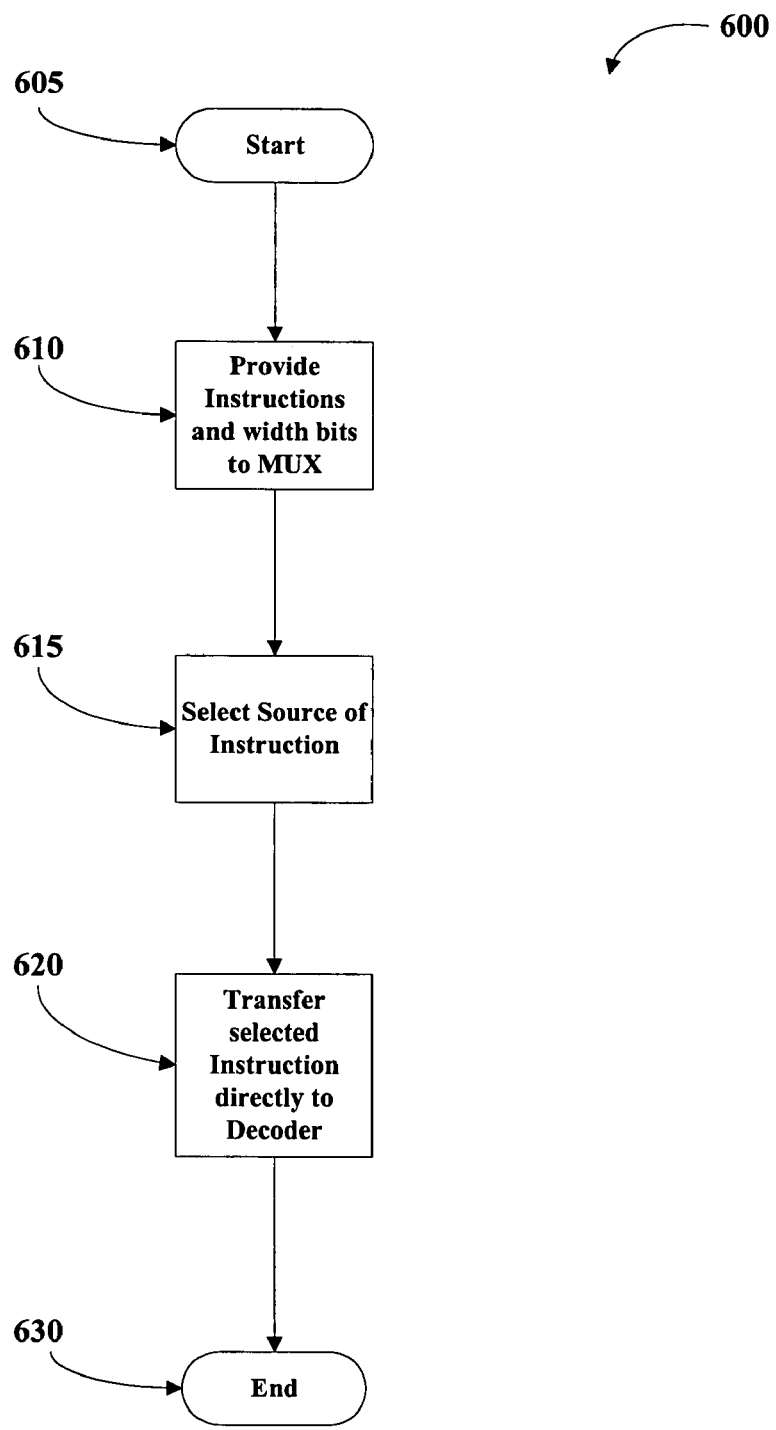
FIG. 6 illustrates the process of providing a selected instruction from multiple sources to the decoder according to one embodiment of the present invention.

A process 600 for providing instructions to the decoder 535 in accordance with one embodiment of the invention is shown in FIG. 6. The process 600 begins at a start block 605. Proceeding to block 610, one or more of the sources provides instructions and corresponding width bits to the MUXs 525, 530. As stated above, the instructions may be a variety of sizes, including 16-bit, 32-bit, or 64-bit. Instructions may be provided by only one of the sources, but instructions and the corresponding width bits may also be provided by two or more of the sources.

Proceeding to block 615, the source to provide the instruction is selected. The DSP 110 may determine that the next instruction be provided by the Icache/alignment unit 505, the loop buffer 510, the emulation instruction register 515, or another source 520. After the DSP 110 determines the instruction to send to the decoder 535, the MUXs 525 and 530 may provide the proper instruction and width bits to the decoder 535.

Proceeding to block 620, the selected instruction and width bit is transferred directly to the decoder 535 without being stored in the instruction register 507. By directly transferring the instructions to the decoder 535, the instruction latency may be lowered and the performance may be increased. The decoder 535 may then execute the instruction. The process then terminates in an end block 630.

Figure 7:
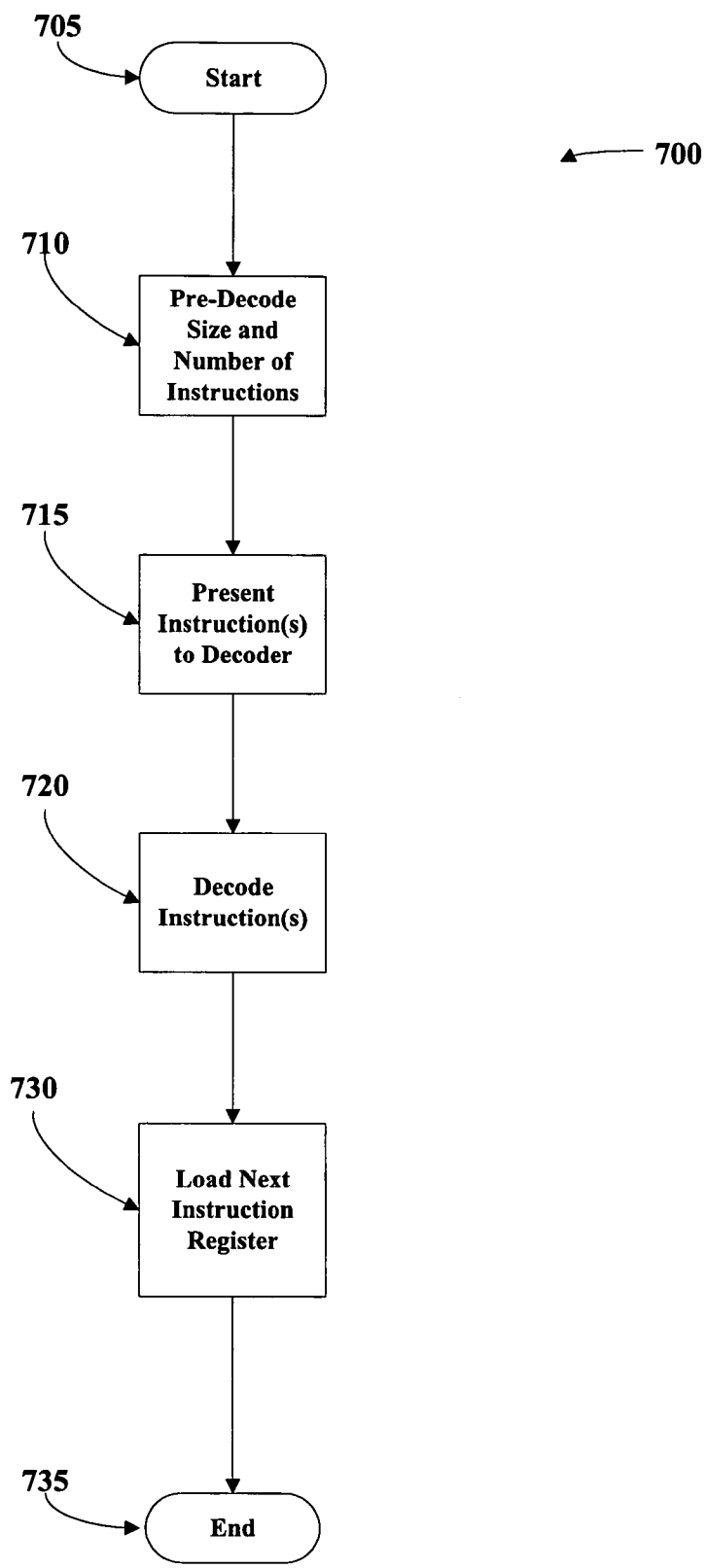
FIG. 7 illustrates the process of decoding variable size instructions and multi-issue from a single register according to one embodiment of the present invention.

FIG. 7 illustrates the process 700 of decoding variable size instructions and multi-issue instructions from a single register according to one embodiment of the present invention. The process 700 occurs within one clock cycle, and all instructions presented during the process 700 are decoded substantially simultaneously. The process 700 may accept instructions from any of the plurality of sources 505–520. Further, the process 700 may be used even if only a single source is directly connected to the decoder 535. The process 700 begins at a start block 705. Proceeding to block 710, the size and number of instructions are pre-decoded in each of the instruction sources by pre-decoders 707. As stated above, a 64-bit instruction register 507 may include one 64-bit instruction or multiple smaller instructions. For example, the instruction register 507 may include only a 32-bit instruction, a 32-bit instruction in combination with two 16-bit instructions, two 32-bit instructions, or other combinations. The size and number of the instructions may be determined from pre-decoding and the 2-bit width bits. The pre-decoding may be performed in the IF2 pipeline stage, thereby decreasing the burden on the decoder 535. After pre-decoding, the DSP 110 knows how many instructions are in the register and the size of each instruction.

Proceeding to block 715, the DSP 110 presents the instructions to be processed to the decoder 535. The DSP 110 presents all the instructions from the instruction register 507 in a single clock cycle. After the instructions are presented to the decoder 535, the process 700 proceeds to block 720. Because the DSP 110 determined the number of instructions present in the instruction register 507 during pre-decoding, this information may be used to determine how many instructions need decoding. In block 720, the decoder 535 decodes each of the instructions. Because the DSP 110 knows the size of each of the plurality of instructions, the decoder 535 knows the starting location of each instruction. The DSP 110 utilizes the information obtained in the pre-decoding to identify the size and location of all instructions to simplify the decoding process. Because the multiple instructions are presented to the decoder 535 at the same time, the decoder 535 can decode all of the instructions in a single clock cycle.

Proceeding to block 730, the next plurality of instructions are presented to the decoded from one of the instruction sources. The process then terminates at an end block 735.

Numerous variations and modifications of the invention will become readily apparent to those skilled in the art. Accordingly, the invention may be embodied in other specific forms without departing from its spirit or essential characteristics.

What is claimed is:

1. A method, comprising:
   receiving instructions from a plurality of instruction sources into a first switching part receiving size information associated with the received instructions into a second switching part;
   using the first and second switching parts to switch among the instruction sources, said using simultaneously providing an instruction and associated size information at an output thereof;
   receiving the output from the first and second switching parts into a decoder; and
   using the decoder to decode each instruction, using said associated size information.

2. The method of claim 1, further comprising decoding the plurality of instructions within a single clock cycle.

3. The method of claim 1, further comprising decoding width bits to determine the size of the instructions.

4. The method of claim 1, where a number of simultaneous instructions is greater than 1, and further comprising communicating the number and size of the plurality of instructions to the decoder.

5. The method of claim 1, further comprising loading a first of the plurality of instructions having a first size and a second of the plurality of instructions having a second size different than said first size.

6. The method of claim 5, further comprising loading a first of the plurality of instructions having a first size, and loading a second and a third of the plurality of instructions having a second size, wherein the first size is 32-bits and the second size is 16-bits.

7. The method of claim 1, handling the plurality of instructions within a digital signal processor.

8. A method as in claim 1, wherein said receiving instructions comprises receiving a plurality of instruction simultaneously and size associated with said plurality of instructions, and decoding the plurality of instructions substantially simultaneously.

9. An apparatus comprising;
   a plurality of instruction sources generating instructions having varying instruction sizes;
   first and second switching elements, which respectively switch instructions originating with said instruction sources, and sizes of said instructions, so that both said instructions and said instruction sizes are simultaneously output; and
   a decoder, which receives said instructions and instruction sizes as inputs thereof.

10. An apparatus as in claim 9, wherein said first and second switching elements switch multiple instructions to the decoder, and said decoder simultaneously decodes said multiple instructions.

11. A method comprising:
    producing instruction sizes respectively associated with a plurality of instructions originating from a plurality of instruction sources;
    switching instructions from said instruction sources using a first switching element;
    switching instruction sizes using a second switching element; and
    simultaneously outputting both of said instructions and said instruction sizes to a decoder.

12. A method as in claim 11, further comprising: outputting an indication of a number of instructions concurrently with the simultaneous outputting.

13. A method as in claim 11, further comprising: decoding the plurality of instructions within a single clock cycle.

14. A method as in claim 11, further comprising: decoding width bits to determine the size of the instructions.

15. A method as in claim 11, further comprising: loading a first of the plurality of instructions having a first size and a second of the plurality of instructions having a second size different than said first size.

16. A method as in claim 11, further comprising loading a first of the plurality of instructions having a first size, and loading a second and a third of the plurality of instructions having a second size, wherein the first size is 32-bits and the second size is 16-bits.

17. A method as in claim 11, further comprising: handling the plurality of instructions within a digital signal processor.

18. An apparatus comprising:
- a first switching element to receive instructions from a plurality of instruction sources;
- a second switching element to receive size information associated with the received instructions, wherein the first and second switching elements are operable to switch among the plurality of instruction sources to simultaneously provide an instruction and associated size information at an output thereof; and
- a decoder to receive the output from the first and second switching elements and to decode each instruction using the associated size information.

* * * * *